Dec. 15, 1942.  W. W. COREY  2,305,377

FIRE HYDRANT, STREET LIGHT STANDARD, AND SIMILAR STRUCTURE

Filed Jan. 31, 1941

INVENTOR;
WILLIAM W. COREY
BY Wells L. Church
ATTORNEY

Patented Dec. 15, 1942

2,305,377

UNITED STATES PATENT OFFICE 2,305,377

FIRE HYDRANT, STREET LIGHT STANDARD, AND SIMILAR STRUCTURES

William W. Corey, St. Louis, Mo., assignor to Iowa Valve Company, Des Moines, Iowa, a corporation of Iowa Application January 31, 1941, Serial No. 376,731

2 Claims. (Cl. 285—140)

This invention relates to fire hydrants, street light standards, and various other structures that are intended to be installed along a roadway, and which comprises a stationary element located above the surface of the ground and connected to an element that is buried in the ground.

The object of my invention is to provide a structure of the general character abovementioned, in which the breakable connecting means used to join the two members or main parts of the structure is inexpensive, easy to install and of such design that it will function properly without liability of causing damage or injury either to the supporting member or to the member mounted on the supporting member.

Briefly described, my invention consists of a fire hydrant, street light standard or similar structure, in which the supporting member and the upright tubular member mounted on same are provided with conventional integral flanges, and the breakable means used to join said two members together comprises a gasket-like, annular part interposed between and snugly engaged by the flanges on said two members, fastening devices positioned in holes in said flanges, and frangible elements connected with said fastening devices and combined with said gasket-like member in such a way that after said fastening devices have been tightened, the upright and supporting member will normally be held in rigid relationship, but an abnormal shock, force, or blow exerted on said upright member will cause said frangible elements to break, thereby releasing said upright element and permitting it to topple over or cant sidewise, the said gasket-like member, fastening devices and frangible elements being so constructed and arranged that in the event said frangible elements rupture, as above described, there is no liability of any part of the breakable connecting means exerting undue pressure on or causing breakage of either one of the two flanges.

Figure 1 of the drawing is an elevational view of a fire hydrant embodying my invention.

Figure 1:
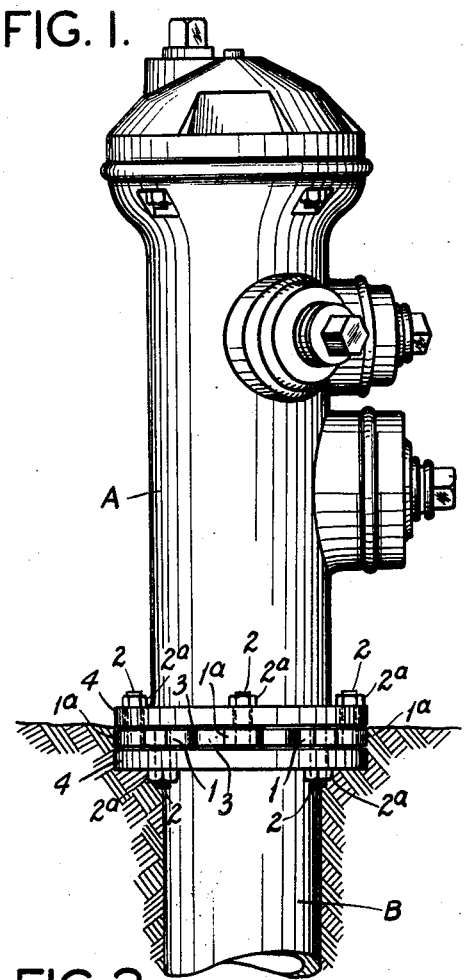

Referring to the drawing, A designates the exposed element or part of the structure that is arranged above the surface of the ground, and B designates the supporting part or element of the structure which usually is buried in the ground. I have herein illustrated the element A as consisting of a fire hydrant, and the supporting part or element B as consisting of a water main or conduit that supplies water to the exposed element A, but I wish it to be understood that my invention is applicable to street light standards, supporting posts and uprights, and in fact, to all types and kinds of street structures that comprise an underground part or supporting element attached to or combined with a second element located above the surface of the ground at a point where it is liable to be subjected to a blow or shock of great force from passing traffic.

The part or element A is joined, fastened or connected to the supporting element B by a unit C provided with two sets of frangible lugs 1 and 1ª that carry threaded fastening devices 2 which engage or pass through flanges or the like on the elements A and B, and thus join said elements together. The connecting unit C comprises a body portion $x$ of substantially ring shape or tubular form in general outline, interposed between the elements A and B, and preferably provided at its opposite ends with machined faces or smooth bearing surfaces 3 that co-operate with similar machined faces or bearing surfaces on the elements A and B to produce tight joints between the connecting unit C and the elements A and B with which it co-operates when the fastening devices 2 carried by or engaged with the lugs 1 and 1ª are tightened. If desired, gaskets may be used to produce tight joints between the connecting unit C and the members between which it is interposed.

Figure 2:
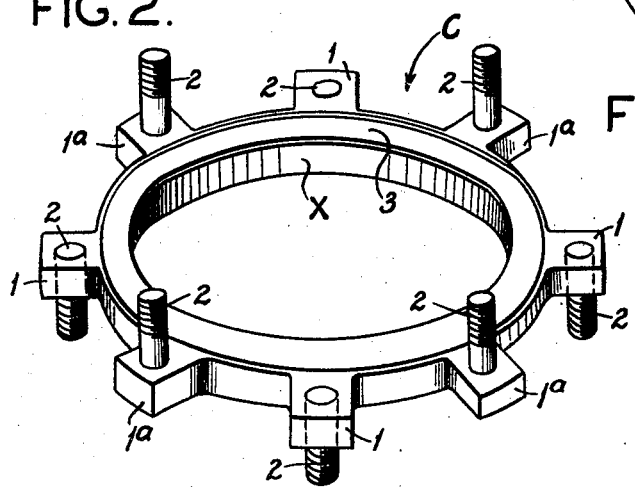
Figure 2 is a perspective view, illustrating one kind of connecting unit that may be used to join the exposed element of the hydrant to the underground element of the structure.

In the form of my invention shown in Figures 1 and 2 the body portion of the connecting unit C is provided with one set of laterally-projecting, frangible lugs 1 that carry fastening devices 2 which co-operate with the upper element A of the structure, and said body portion is also provided with a separate set of laterally-projecting, frangible lugs 1ª that carry fastening devices 2 which co-operate with the supporting element B of the structure. The fastening devices 2 are disposed vertically in parallel relationship to the longitudinal axis of the connecting unit C and the elements A and B, and extend vertically through horizontal flanges 4 on the elements A and B. Said fastening devices 2 preferably consist of threaded studs carried by the frangible lugs and equipped with nuts 2ª that bear upon the flanges 4, but they may consist of screws that pass through holes in the flanges 4 and are screwed into tapped holes in the frangible lugs on the connecting unit C. The connecting unit C preferably consists of a casting provided with integral, laterally-projecting lugs of the kind referred to, and in the form of my invention shown in Figures 1 and 2, the lugs 1ª are arranged between or in staggered relationship with the lugs 1, in spaced relationship around the periphery of the connecting unit. In assembling the parts of the structure, the connecting unit C is mounted on the supporting member B and secured to same by the downwardly-projecting fastening devices 2 on the frangible lugs 1 on said unit. Thereafter, the upright tubular member A is superimposed upon the unit C and secured to same by the fastening devices on the frangible lugs 1ª of the unit C, that pass upwardly through the flange 4 on the member A. In the operation of tightening the fastening devices previously referred to, the flanges 4 on the members A and B are drawn into tight clamping engagement with the top and bottom surfaces of the unit C, and the frangible lugs 1 and 1ª on said unit are put under some tension. Consequently, if the upright tubular member A is subsequently subjected to a lateral shock or blow of considerable force, one or the other set of frangible lugs on the connecting unit C will rupture, thus releasing the member A from the supporting member B and permitting said member A to topple over, without causing the fastening devices to exert a destructive strain on the flange of either the member A or the member B. The repair or restoration of the structure to its normal condition can be effected quickly and easily simply by removing the broken unit C, substituting a new or perfect unit in place of same, and then adjusting or manipulating the fastening devices that are used to draw the elements A and B into snug engagement with the connecting unit C and hold said parts in rigid relationship with each other.

Figure 3:
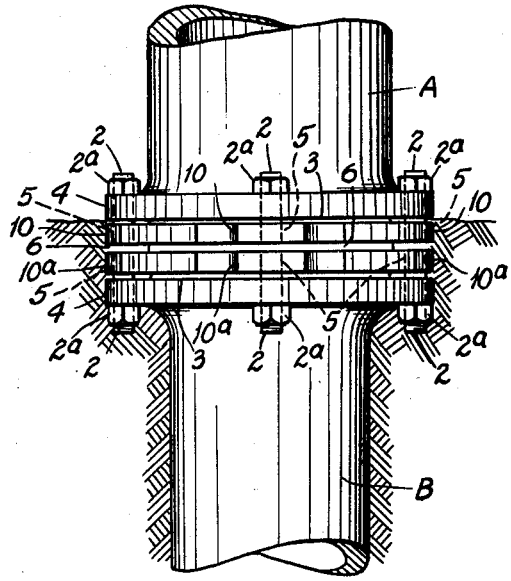
Figure 3 is a fragmentary elevational view, illustrating another form of connecting unit embodying my invention, interposed between the exposed element and the underground element of the structure.
Figure 4:
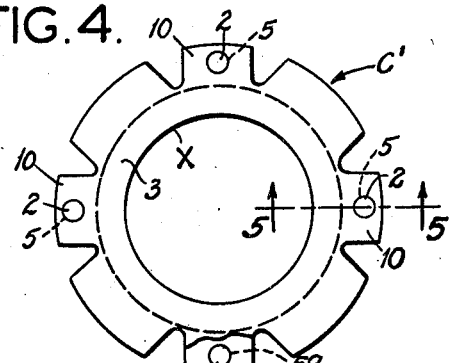
Figure 4 is a top plan view of the connecting unit shown in Figure 3.
Figure 5:
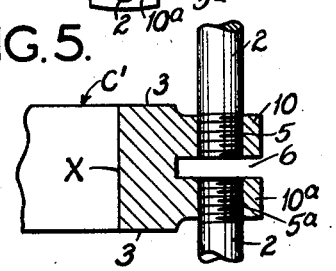
Figure 5 is a fragmentary vertical sectional view, taken on the line 5—5 of Figure 4.

In Figures 3, 4 and 5 I have illustrated another form of my invention, wherein the connecting unit C' is provided with two sets of laterally-projecting, frangible lugs 10 and 10ª that are arranged in vertical alignment with each other, or, in other words, with the lugs 10 disposed directly over the lugs 10ª. In this form of my invention the frangible lugs of the connecting unit C' are provided with tapped holes 5 that are adapted to receive screws or threaded studs 2 that pass vertically through the horizontal flanges 4 on the two elements A and B of the structure, the lugs 10ª being separated from the lugs 10 by slots or gaps 6, as shown more clearly in Figure 5.

Either of the connecting units above described is inexpensive to manufacture, as it consists of a casting of simple design that can be converted into a finished product by simple machine operations, i. e., by forming seats or smooth faces on the end portions of the casting that bear against the two elements between which the connecting unit is interposed, and forming holes in the frangible, laterally-projecting lugs on said casting that receive the fastening devices. Such a connecting unit is efficient and highly reliable for the purpose for which it is employed, for when it is in operative position, it produces a gas and water-tight joint between the two elements A and B which it joins together, and it holds said parts in rigid relationship when the exposed element or top member A of the structure is subjected to a lateral abnormal blow or shock, whereupon one set of the frangible lugs of the connecting unit will rupture, as previously explained. In addition to the desirable features above pointed out, my improved connecting unit has the further advantage of being capable of quick removal and installation, which characteristic is exceedingly important from a commercial standpoint, particularly when the unit is employed for connecting a fire hydrant to an underground water main.

Having thus described my invention, what I claim as new and desire to secure by Letters Patent is:

1. A fire hydrant, street light standard, or similar highway accessory, comprising an upright tubular member provided with a horizontally-disposed flange, a supporting member provided with a horizontally-disposed flange, a removable collar positioned between said flanges, separate sets of integral frangible lugs on said collar projecting laterally from same, and fastening devices rigidly attached to said frangible lugs and projecting upwardly and downwardly through holes in said flanges, said fastening devices having nuts or heads that exert clamping pressure on said flanges.

2. A structure of the kind described in claim 1, in which one set of frangible lugs on said collar are arranged in superimposed relation and in longitudinal alignment with the other set of frangible lugs on said collar.

WILLIAM W. COREY.